US008122343B2

(12) United States Patent
Eisen

(10) Patent No.: US 8,122,343 B2
(45) Date of Patent: *Feb. 21, 2012

(54) SYSTEM FOR CREATING A REUSABLE LIST, SAVING IT IN A CLIPBOARD, AND ACCESSING A CURRENT DOCUMENT VERSION BY SELECTING A HYPERLINK ON THE LIST

(75) Inventor: Jeffrey N Eisen, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 777 days.

This patent is subject to a terminal disclaimer.

(21) Appl. No.: 12/179,997

(22) Filed: Jul. 25, 2008

(65) Prior Publication Data

US 2008/0282141 A1 Nov. 13, 2008

Related U.S. Application Data

(63) Continuation of application No. 10/034,255, filed on Jan. 3, 2002, now Pat. No. 7,447,990.

(51) Int. Cl.
*G06F 17/00* (2006.01)

(52) U.S. Cl. .......................... 715/234; 715/200; 715/256

(58) Field of Classification Search .................. 715/200, 715/234, 255–256, 205
See application file for complete search history.

(56) References Cited

U.S. PATENT DOCUMENTS

| | | | | |
|---|---|---|---|---|
| 6,260,050 | B1 | 7/2001 | Yost et al. | 715/202 |
| 6,356,922 | B1 | 3/2002 | Schilit et al. | 715/236 |
| 6,684,239 | B1 | 1/2004 | Flepp et al. | 709/206 |
| 6,707,472 | B1 | 3/2004 | Grauman | 715/752 |
| 2003/0046365 | A1 | 3/2003 | Pfister et al. | 709/219 |
| 2003/0097361 | A1 | 5/2003 | Huang et al. | 707/10 |

OTHER PUBLICATIONS

Barnes, "10 Minute Guide to Windows 3.1", Sams, 1992, pp. 60-65.
Outlook 2000 sp-3 copy and paste screendumps, Microsoft Corp., 1999, 3 pages.
Outlook 97 email editing screendumps, Microsoft Corp., 1996, 5 pages.

*Primary Examiner* — Thu Huynh
(74) *Attorney, Agent, or Firm* — Pillsbury Winthrop Shaw Pittman LLP

(57) ABSTRACT

A computer system that allows a user to select one or more of the documents that are listed in a summary view of documents and creates a list of the selected documents. Advantageously, for each selected document, the list includes document summary data pertaining to the selected document and a hyperlink to the selected document.

14 Claims, 6 Drawing Sheets

100

| Date | From | Subject |
|---|---|---|
| 10/10/2001 | John Smith | Tomorrow's meeting |
| 10/12/2001 | Brian Scott | What time is the meeting? |
| 10/10/2001 | Bill Jones | lunch plans? |
| 10/13/2001 | Mary Smith | Meeting canceled |
| 10/11/2001 | Tom Doe | Announcement |
| 10/13/2001 | Jane Doe | Quick question |

FIG. 1

402 → DocLink    10/12/2001    Brian Scott    What time is the meeting?
         ↑413                                         ↑412
404 → DocLink    10/13/2001    Mary Smith    Meeting Canceled
         ↑415                                      ↖414

| | Date | From | Subject |
|---|---|---|---|
| DocLink 413 | 10/12/2001 | Brian Scott | What time is the meeting? 412 |
| DocLink 415 | 10/13/2001 | Mary Smith | Meeting Canceled 414 |

501 → (header row)
502 → (first data row)
503 → (second data row)

FIG. 5

SYSTEM FOR CREATING A REUSABLE LIST, SAVING IT IN A CLIPBOARD, AND ACCESSING A CURRENT DOCUMENT VERSION BY SELECTING A HYPERLINK ON THE LIST

This application is a continuation of U.S. patent application Ser. No. 10/034,255, filed Jan. 3, 2002, which is incorporated herein by reference in its entirety.

BACKGROUND OF THE INVENTION

1. Field of the Invention

The present invention relates to a system and method for enabling a user to select documents from a summary view of documents and to create a list of the selected documents.

2. Discussion of the Background

There are numerous systems that generate and/or display a summary view of one or more documents. As used herein, the term document means document, message, file, or other unit of information.

One example of a system that generates and/or displays a summary view of one or more documents is a conventional electronic mail (e-mail) system. A conventional e-mail system allows a user to view the contents of his or her e-mail inbox by displaying a summary view of the one or more e-mail documents (i.e., messages) stored in the inbox. FIG. 1 illustrates an example of such a summary view 100. As shown in FIG. 1, summary view 100 includes document summary data for each e-mail in the inbox. Document summary data is data that pertains to a document. For example, for a document such as an e-mail message, document summary data may include any one or more of the following: the title or subject of the document, the sender of the document, the recipient of the document, the time the document was sent, and other document summary data.

Another example of a system that generates a summary view of one or more documents is an Internet search engine. An Internet search engine takes as input a query string, searches the Internet for documents that match the query string, and produces as output a list of the titles and URLs of the documents that match the query string. This list of document titles and URLs is transmitted to a web browser, which displays a summary view of the documents that match the search criteria by displaying the list of document titles received from the search engine.

Still another example of a system that generates a summary view of one or more documents is an electronic bulletin board system. An electronic bulletin board system is an electronic message center that lets user of the system post messages to an electronic bulletin board and to reply to messages that have been posted. Most bulletin board systems allow what is called "discussion threads." A discussion thread is a series of related messages. Conventionally, when a user accesses a bulletin board system, the system generates a summary view of one or more messages that have been posted to the bulletin board. The user then browses the summary view and selects the message that the user would like to read.

A disadvantage of conventional systems that are capable of displaying a summary view of documents is that these conventional systems do not allow a user to select one or more of the documents listed in the summary view and easily create a list of the documents that are selected. Other drawbacks exist.

SUMMARY OF THE INVENTION

The present invention provides a computer system and computer implemented method that allows a user to select one or more of the documents that are listed in a summary view of documents and creates a list of the selected documents. Advantageously, for each selected document, the list includes document summary data pertaining to the selected document and a hyperlink to the selected document.

In one aspect, a method according to the present invention includes the steps of: displaying a summary view of one more documents to a user, allowing the user to select one or more of the documents listed in the summary view, creating a list of the selected documents, wherein, for each selected document, the list includes document summary data pertaining to the selected document and a hyperlink to the selected document, and storing the list in a system clipboard so that the list can be pasted into one or more documents or transferred to programs other than the one that displays the summary view of documents.

In one aspect, a computer system according to the present invention includes a processor and memory that stores software (also referred to as "computer readable program code") that is executed by the processor, wherein when the processor executes the software the computer system is operable to display a summary view of one more documents to a user, allow the user to select one or more of the documents listed in the summary view, create a list of the selected documents, wherein, for each selected document, the list includes document summary data pertaining to the selected document and a hyperlink to the selected document, and store the list in a system clipboard so that the list can be pasted into documents.

In one embodiment, the step of creating the list of the selected documents includes the step of creating a table having a row for each selected document, wherein each row has one or more fields. Preferably, the field(s) of the first row of the table include field headings (such as "Title," "Subject," "To," or other field headings). The step of creating the list further includes the step of inserting the document summary data and the hyperlinks included in the list into the other rows of the table. The step of storing the list in the system clipboard includes the step of storing the table in the system clipboard so that the table can be pasted into documents or transferred to other programs.

The above and other features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

FIG. 1 illustrates a conventional summary view of documents.

FIG. 4 illustrates a list according to one embodiment of the present invention.

FIG. 5 illustrates a table according to one embodiment of the present invention.

DETAILED DESCRIPTION OF THE PREFERRED EMBODIMENTS

While the present invention may be embodied in many different forms, there is described herein in detail an illustrative embodiment with the understanding that the present disclosure is to be considered as an example of the principles of the invention and is not intended to limit the invention to the illustrated embodiment.

Figure 2:
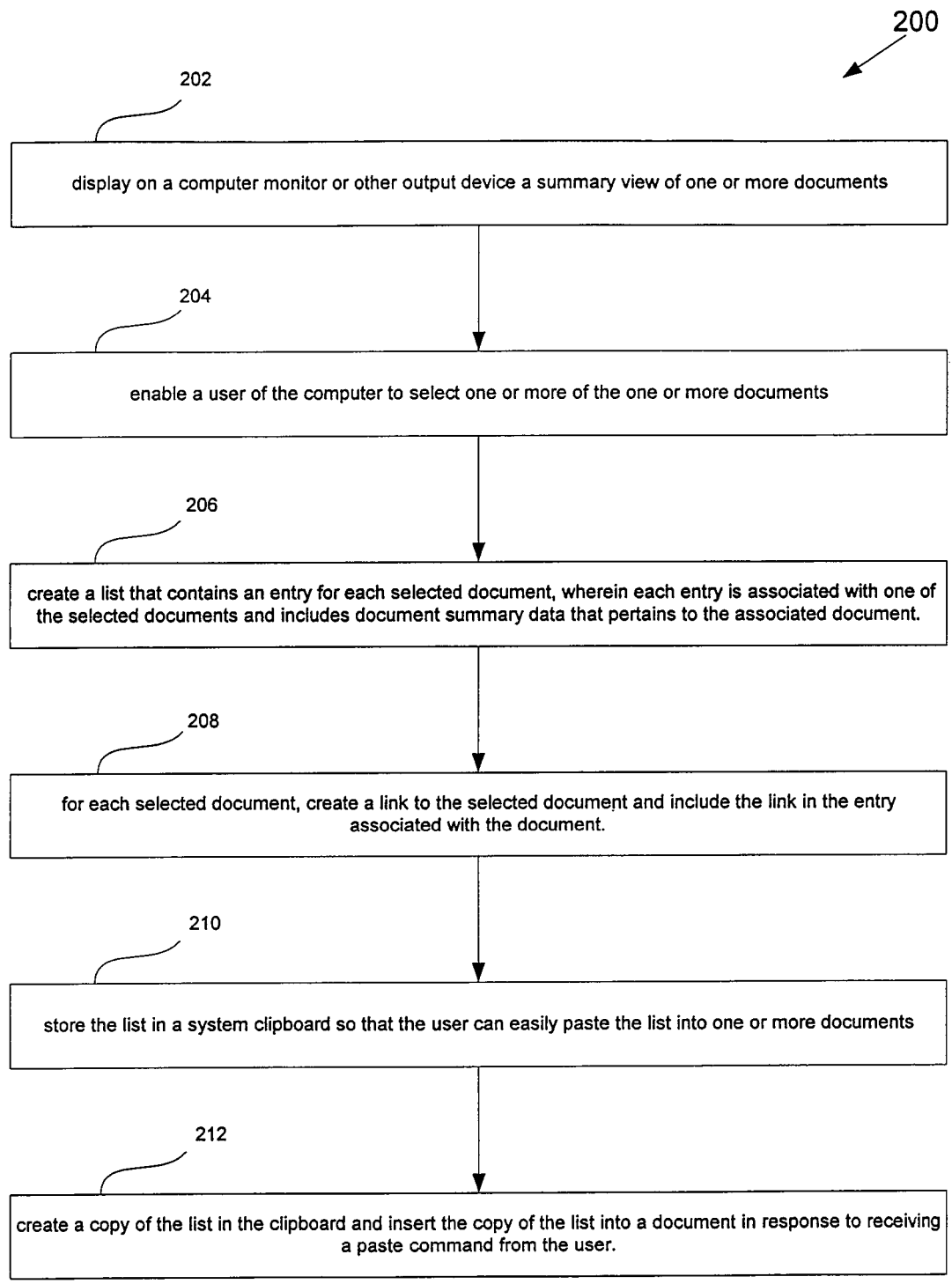
FIG. 2 is a flow chart illustrating a computer implemented process 200 according to one embodiment of the present invention.

FIG. 2 is a flow chart illustrating a computer implemented process 200 according to one embodiment of the present invention. Process 200 begins in step 202 where the computer displays on a computer monitor or other output device a summary view of one or more documents (i.e., N documents where N is an integer greater than or equal to 1). A summary view of N documents is a document list having N entries, wherein each entry is associated with one of the N documents and includes document summary data that pertains to the associated document.

Figure 3:
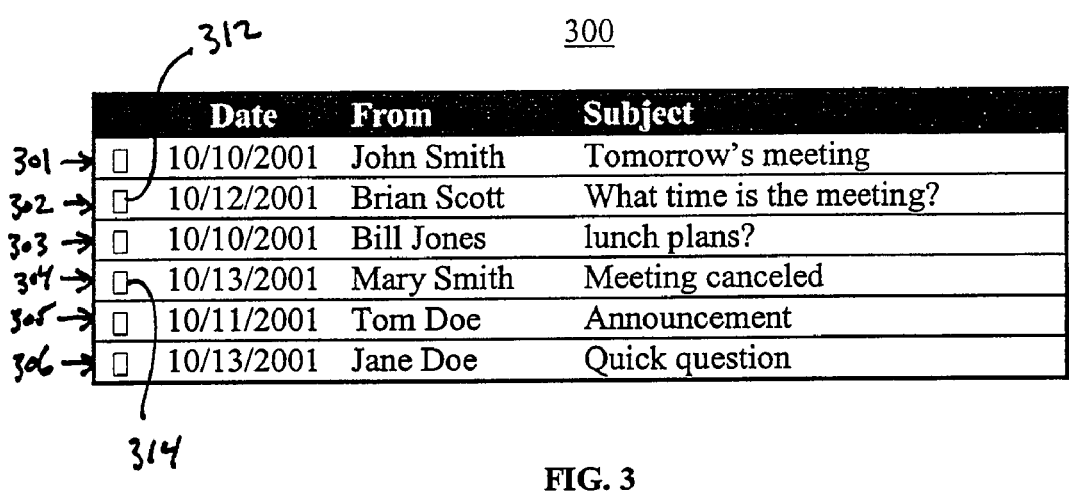
FIG. 3 illustrates an example summary view.

FIG. 3 illustrates an example summary view 300 of N documents where N=6. As shown in FIG. 3, summary view 300 is a list having six entries 301-306. Each entry includes document summary data that pertains to a document.

Next (step 204), the computer enables a user of the computer to select one or more of the N documents by selecting one or more of the entries in the displayed list. Using summary view 300 as an example, if the user desired to select the document associated with entry 303, the user would select entry 303.

There are numerous ways that the computer can enable the user to select one or more of the entries in the displayed list. For example, as shown in FIG. 3, the computer can display a check-box adjacent to each entry so that if the user wanted to select entry 302 and 304, the user would put a check in check-boxes 312 and 314, respectively. As another example, the user may select an entry by clicking on the entry while holding down a predetermined keyboard key. Other ways of selecting one or more entries are possible. In response to the user selecting an entry, the computer, in one embodiment, sets an internal flag that indicates that the entry was selected. That is, in one embodiment, each entry is associated with an internal flag, and when an entry is selected by the user, the computer sets the flag associated with the entry to a particular state that indicates that the entry was selected.

After the user selects one or more of the entries from the list, the user may click on a particular user interface button, select a particular menu item, or otherwise indicate to the computer that the user desires to have the computer create a list of the selected entries and store the list in a system clipboard.

Next (step 206), in response to receiving the indication from the user, the computer creates a list of the selected entries. More specifically, in one embodiment, the computer determines the entries that have been selected by the user by examining the flags that are associated with the entries, and, for each selected entry (e.g., each entry who's associated flag is set to the particular state), copies document summary data that is included in the selected entry and adds the copied document summary data to the list, thereby creating a new entry in the list.

Next (step 208), for each selected entry, the computer creates a hyperlink to the document associated with the selected entry and includes the hyperlink in the entry created in step 206. Each hyperlink to a document includes a locator for locating the document. For example, if the document resides on the computer's file system, the computer determines the pathname of the document (i.e., the file name of the document and the folder(s) in which the document is stored) and uses the pathname in creating the hyperlink to the document. As another example, if the document is an Internet document, the computer determines the URL for the document and uses the URL in creating the hyperlink.

FIG. 4 illustrates a list 400, according to one embodiment, that is created by the computer when the user selects entries 302 and 304 of summary view 300 and indicates to the computer that the user desires to have the computer create a list based on the selected entries. List 400 includes two entries: entry 402 and 404. Entry 402 corresponds to entry 302 and entry 404 corresponds to entry 304. As shown in FIG. 4, entry 402 includes document summary data 412 that was copied from entry 302 and a hyperlink 413 that references the document associated with entry 302. Similarly, entry 404 includes document summary data 414 that was copied from entry 304 and a hyperlink 415 that references the document associated with entry 304.

Although hyperlinks 413 and 415 are shown as being separate from document summary data 412 and 414, respectively, it is contemplated that the document summary data 412 and 414 and hyperlinks 413 and 415, respectively, may be combined so that when the user clicks on or otherwise selects summary data 412 or 414, this action will activate the hyperlink 413 or 415 and cause the computer to display the appropriate document.

Next (step 210), the computer stores list 400 in its clipboard, which enables the user to paste list 400 into other applications and documents. Because list 400 includes a hyperlink to each document referenced in list 400, a user can easily access a document that is referenced in list 400 by pasting list 400 into a document and then clicking on the hyperlink in list 400 that is associated with the document. For example, if the user desired to view the document associated with entry 302, the user could paste list 400 into a document and then click on hyperlink 413. In response to the user clicking on a hyperlink, the computer displays to the user the document associated with the hyperlink.

Next (step 212), in response to receiving a paste command from the user, the computer creates a copy of the list in the clipboard and inserts the copy of the list into a document or application.

In one embodiment, the computer places the list in a table and stores the table in the clipboard. Preferably, if the summary view includes field headings then the first row of the table includes those field headings. Once the table is stored in the clipboard, the user can paste the table into one or more documents. After pasting the table into a document, the user can view a document associated with an entry in the table by clicking on the appropriate hyperlink. FIG. 5 illustrates an exemplary table 500 that includes list 400. As shown in FIG. 5, table 500 has three rows and four columns. The first row 501 of table 500 includes the following field headings: "Date," "From," and "Subject." The second row 502 includes document hyperlink 413 and document summary data 412. The third row 503 includes document hyperlink 415 and document summary data 414. When the user desires to view the document to which document summary data 414 pertains, the user need only click on or otherwise activate hyperlink 415, which causes the computer to display the document.

In other embodiments, as described above, hyperlinks 413 and 415 can be combined with document summary data 412 and 414, respectively, so that the document summary data 412 and 414 are themselves hyperlinks to the document to which the summary data pertains. That is, for example, the user can view the document associated with document summary data 412 by clicking-on or otherwise selecting document summary data 412.

Figure 6:
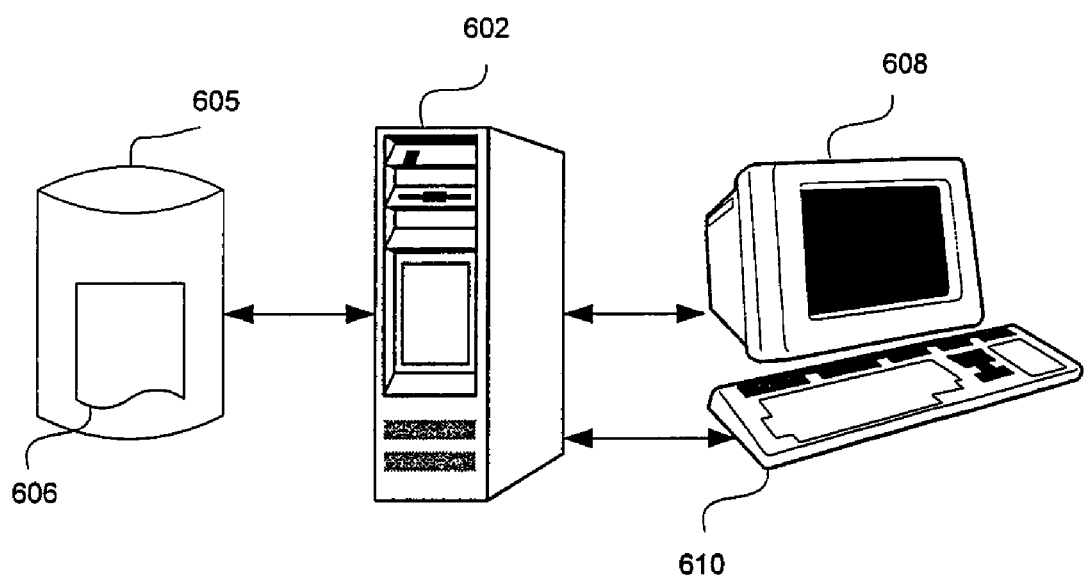
FIG. 6 is a functional block diagram of a computer system according to one embodiment of the present invention.

FIG. 6 is a functional block diagram of a computer system 600 according to the present invention. The computer system includes a processing unit 602, a computer readable medium 605 that stores software 606, a monitor 608, and one or more user input devices 610, such as a keyboard, mouse, or other user input device. Software 606 enables computer 600 to perform the method described above.

While various illustrative embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computer system, comprising:
   one or more processors configured to execute computer program code, the computer program code being executable to direct the computer system to:
   display a summary view of one or more entries, wherein each of the one or more entries is associated with a document and includes summary data regarding the associated document;
   enable a user to select one or more of the entries listed in the summary view;
   receive input from the user to create a reusable list of the selected entries and to store the list in a system clipboard;
   create the reusable list of the selected entries and storing the reusable list in the system clipboard in response to the input received from the user, wherein for each of the one or more selected entries, the reusable list includes document summary data pertaining to the document associated with the selected entry, and a hyperlink to the document associated with the selected entry, not a copy of the document, and wherein the reusable list is able to be pasted into one or more documents or transferred to one or more programs in addition to the program displaying the summary view; and
   display a current version of a document associated with a hyperlink, including any changes made to the document subsequent to creating the reusable list, in response to the user selecting the hyperlink from the reusable list.

2. The system of claim 1, wherein the document summary data pertaining to the document associated with the selected entry and the hyperlink to the document associated with the selected entry are combined so that the user can click on the document summary data itself to activate the hyperlink.

3. The system of claim 1, wherein the one or more entries are associated with electronic mail messages.

4. The system of claim 1, wherein the one or more entries are associated with documents that were found by an Internet search engine.

5. The system of claim 1, wherein the one or more entries are associated with messages that are included in a discussion thread.

6. The system of claim 1, wherein enabling the user to select one or more of the entries comprises displaying a check-box for each of the entries, wherein the user selects an entry by placing a mark in the check-box associated with the entry.

7. The system of claim 1, wherein creating the reusable list further comprises inserting the document summary data and the hyperlinks included in the reusable list into one or more rows of a table, and wherein the table is stored in the system clipboard.

8. A non-transitory computer readable medium having computer readable program code embodied therein, the computer readable program code comprising:
   computer readable program code for displaying a summary view of one or more entries, wherein each of the one or more entries is associated with a document and includes summary data regarding the associated document;
   computer readable program code that enables the user to select one or more of the entries listed in the summary view;
   computer readable program code for receiving input from the user to create a reusable list of the selected entries and to store the list in a system clipboard;
   computer readable program code for creating the reusable list of the selected entries and storing the reusable list in the system clipboard in response to the input received from the user, wherein for each of the one or more selected entries, the reusable list includes document summary data pertaining to the document associated with the selected entry, and a hyperlink to the document associated with the selected entry, not a copy of the document, and wherein the reusable list is able to be pasted into one or more documents or transferred to one or more programs in addition to the program displaying the summary view; and
   computer readable program code for displaying a current version of a document associated with a hyperlink, including any changes made to the document subsequent to creating the reusable list, in response to the user selecting the hyperlink from the reusable list.

9. The computer readable medium of claim 8, wherein the document summary data pertaining to the document associated with the selected entry and the hyperlink to the document associated with the selected entry are combined so that the user can click on the document summary data itself to activate the hyperlink.

10. The computer readable medium of claim 8, wherein the one or more entries are associated with electronic mail messages.

11. The computer readable medium of claim 8, wherein the one or more entries are associated with documents that were found by an Internet search engine.

12. The computer readable medium of claim 8, wherein the one or more entries are associated with messages that are included in a discussion thread.

13. The computer readable medium of claim 8, wherein the computer readable program code for enabling the user to select one or more of the entries comprises computer readable program code for displaying a check-box for each of the entries, wherein the user selects an entry by placing a mark in the check-box associated with the entry.

14. The computer readable medium of claim 8, wherein the computer readable program code for creating the reusable list further comprises computer readable program code for inserting the document summary data and the hyperlinks included in the reusable list into one or more rows of a table, and wherein the table is stored in the system clipboard.

* * * * *